(12) United States Patent
Hosono et al.

(10) Patent No.: US 7,734,312 B2
(45) Date of Patent: Jun. 8, 2010

(54) RADIO BASE STATION AND METHOD OF DETECTING OVERLAP OF RADIO COMMUNICATIONS PARAMETER

(75) Inventors: Hiroyuki Hosono, Yokohama (JP); Shinichi Mori, Yokohama (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 550 days.

(21) Appl. No.: 11/695,882

(22) Filed: Apr. 3, 2007

(65) Prior Publication Data
US 2007/0232313 A1   Oct. 4, 2007

(30) Foreign Application Priority Data
Apr. 4, 2006   (JP)   ............................ P2006-103134

(51) Int. Cl.
*H04B 1/38*   (2006.01)

(52) U.S. Cl. ........................ 455/561; 455/434; 455/443; 455/515

(58) Field of Classification Search ................. 455/561, 455/550.1, 67.11, 67.14, 68, 560, 507, 511, 455/515, 434, 443, 448
See application file for complete search history.

(56) References Cited

FOREIGN PATENT DOCUMENTS
JP   2005-175611   6/2005

*Primary Examiner*—Tony T Nguyen
(74) *Attorney, Agent, or Firm*—Oblon, Spivak, McClelland, Maier & Neustadt, L.L.P.

(57) ABSTRACT

Disclosed is a radio base station including: a common control channel transmission unit configured to transmit a common control channel by using radio communications parameter to be assigned to each radio base station; a transmission level determination unit configured to transmit the common control channel according to a predetermined transmission pattern; a reception level supervision unit configured to acquire a reception level of the common control channel received by a mobile station; and an overlap determination unit configured to determine whether or not the predetermined radio communications parameter overlaps with a radio communications parameter used in a different radio base station based on the reception level acquired by the reception level supervision unit and the predetermined transmission pattern.

11 Claims, 8 Drawing Sheets

RADIO BASE STATION AND METHOD OF DETECTING OVERLAP OF RADIO COMMUNICATIONS PARAMETER

CROSS REFERENCE TO RELATED APPLICATIONS

This application is based upon and claims the benefit of priority from the prior Japanese Patent Application No. P2006-103134, filed on Apr. 4, 2006; the entire contents of which are incorporated herein by reference.

BACKGROUND OF THE INVENTION

1. Field of the Invention

The present invention relates to a radio base station, which performs radio communications with a mobile station, and a method of detecting overlap of a radio communications parameter. In particular, the present invention relates to a radio base station and a method of detecting overlap of the radio communications parameter, both of which detect whether or not a parameter for radio communications such as a spreading code for each radio base station is assigned in an overlap manner to a plurality of radio base stations.

2. Description of the Related Art

In a radio communications system of multiple access, in which multiple communications are simultaneously performed between a radio base station and mobile stations, each radio communications channel used in the communications needs to be identified. For example, in a radio communications system (what is so called the third generation mobile communications system) based on a code division multiple access (hereinafter, referred to as CDMA), each communications channel is identified with a spreading code (radio communications parameter), which is a random code sequence. Specifically, a channelization code and a scrambling code (hereinafter, referred to as ScC) are set as the spreading code. The channelization code is used for spreading user data in wideband, and the scrambling code is used for preventing interference between cells.

In a wideband code division multiple access (W-CDMA), which is one of the third generation mobile communications systems, 512 scrambling codes (downlink) are specified. Since the number of scrambling codes is limited, the same scrambling code is repeatedly assigned in a system while attempting not to assign the same scrambling code to near cells.

Conventionally, a measure to prevent the same scrambling codes from being assigned to radio base stations was taken based on a simulation using a computer. Specifically, the same scrambling code is not assigned to base stations having overlapping coverage areas which are estimated by the simulation. Here, the coverage area means an area where radio waves can reach from the base station. Accordingly, when a radio base station is to be newly provided in due to an increase in traffic, it is necessary to reconsider the assignment of scrambling codes. Moreover, the assignment of scrambling codes needs to be also reconsidered when a difference occurred between the coverage area based on a simulation using a computer and the actual coverage area.

In the meantime, a method in which a radio communications system (radio base station and mobile stations) autonomously determines scrambling codes of a downlink (for example, in Japanese Patent Application Laid-open Publication No. 2005-175611 (on pages 9 to 10 of FIG. 6)). Specifically, the radio base stations autonomously determine scrambling codes of a downlink. Each mobile station detects the overlap of a scrambling code (downlink) used by a radio base station and a different radio base station located near the radio base station. The mobile station notifies the radio base station of the overlap of the scrambling codes which have been autonomously assigned by the base station. Upon receipt of the notification from the mobile station, the radio base station changes the scrambling code to a different scrambling code.

SUMMARY OF THE INVENTION

However, there are following problems in the aforementioned conventional method of determining scrambling codes. Specifically, in order to detect the overlap of a radio communications parameter to be assigned to each radio base station, the mobile station needs to have a function to detect the overlap of the parameter. In other words, since replacement or upgrading of the mobile stations is involved, it is not realistic to adopt this method in existing radio communications systems already in service, such as W-CDMA.

The present invention has been made in view of such a situation. An object of the present invention is to provide a radio base station and a method of detecting the overlap of a radio communications parameter, both of which are capable of detecting overlap of a radio communications parameter with other base stations without installing a overlap detecting function to a mobile station.

In order to solve the aforementioned problems, the present invention includes the following features. A first feature of the present invention is summarized as a radio base station (for example, radio base station 100D) performing radio communications with mobile stations (for example, mobile stations 300A to 300N) including a common control channel transmission unit (common control channel transmission unit 114) configured to transmit a common control channel (common control channel $CH_D$) used commonly for all of the mobile stations located within a cell (cell $10_D$) by using a predetermined radio communications parameter (scrambling code $C_D$) to be assigned to each radio base station; a transmission pattern controller (transmission level determination unit 110) configured to cause the common control channel to be transmitted from the common control channel transmission unit according to a predetermined transmission pattern (transmission pattern P1); a common control channel reception level acquisition unit (reception unit 104 and reception level observing unit 108) configured to acquire a reception level of the common control channel received by at least any one of the mobile stations; and a overlap determination unit (overlap determination unit 106) configured to determine whether or not the predetermined radio communications parameter overlaps with a radio communications parameter used by a different radio base station (for example, radio base station 100A) based on the reception level acquired by the common control channel reception level acquisition unit and the predetermined transmission pattern.

According to such a radio base station, whether or not a predetermined radio communications parameter such as a spreading code overlaps with a radio communications parameter used by a different radio base station is determined based on a reception level of a common control transmission channel received by a mobile station and a predetermined transmission pattern. It should be noted that the measurement of the reception level of a common control channel by a mobile station can be realized by use of an existing function of the mobile station.

Thus, it is possible to detect that a radio communications parameter overlaps with a radio communications parameter used in a different radio base station without installing in a mobile station a function to detect the overlap of a radio communications parameter to be assigned to each radio base station.

A second feature of the present invention is summarized as the radio base station according to the first feature of the present invention further including a parameter changing unit (parameter changing unit 116) configured to change a value of the predetermined radio communications parameter in a case where the overlap determination unit determines that the predetermined radio communications parameter overlaps with a radio communications parameter used in the different radio base station.

A third feature of the present invention is summarized as the radio base station according to second feature of the present invention further including a parameter notification unit (parameter notification unit 118) configured to notify the different radio base station of a radio communications parameter after a change of the predetermined radio communications parameter in a case where the value of the predetermined radio communications parameter is changed by the parameter changing unit.

A fourth feature of the present invention is summarized as follows. In the radio base station of the first feature of the present invention, the transmission pattern controller causes the common control channel to be transmitted from the common control channel transmission unit according to the predetermined transmission pattern in which transmission of the common control channel, and stopping of the transmission of the common control channel are repeated.

A fifth feature of the present invention is summarized as follows. In the radio base station of the fourth feature of the present invention, a period of time, in which the transmission of the common control channel is stopped, is shorter than any one of a period of time until the mobile station determines that the mobile station has moved out of the cell (interval S1), and a period of time until the mobile station determines to move to communications via the different base station.

A sixth feature of the present invention is summarized as follows. In the radio base station of the fourth feature of the present invention, the overlap determination unit determines that the predetermined radio communications parameter overlaps with the radio communications parameter used by the different radio base station in a case where the reception level, at the time of stopping the transmission of the common control channel, is equal to or greater than a first threshold value (overlap determination threshold value 1).

A seventh feature of the present invention is summarized as follows. In the radio base station of the first feature of the present invention, the common control channel reception level acquisition unit acquires a reception level of a common control channel (common control channel $CH10_A$) which is received from the different radio base station by a mobile station located within a cell (for example, cell $10_A$) served by the different radio base station and wherein the common control channel reception level acquisition unit acquires the reception level from the different radio base station.

An eighth feature of the present invention is summarized as follows. In the radio base station of the seventh feature of the present invention, the overlap determination unit determines that the predetermined radio communications parameter overlaps with the radio communications parameter used in the different radio base station, in a case where a pattern of the reception level of the mobile station located within the cell served by the different radio base station matches the predetermined transmission pattern, while the different radio base station continuously transmits a common control channel.

A ninth feature of the present invention is summarized as follows. In the radio base station of the eighth feature of the present invention, the overlap determination unit determines that the predetermined radio communications parameter overlaps with the radio communications parameter used by the different radio base station in a case where a timing at which the reception level becomes equal to or less than a second threshold value synchronizes with a timing at which the transmission of the common control channel is stopped.

A tenth feature of the present invention is summarized as follows. In the radio base station of the first feature of the present invention, the transmission pattern controller causes the common control channel to be transmitted from the common control channel transmission unit according to the predetermined transmission pattern, in a case where the number of mobile stations located within the cell becomes equal to or greater than a predetermined number.

An eleventh feature of the present invention provides a method of detecting overlap of a radio communications parameter, which is used for detecting that the radio communications parameter to be assigned to each radio base station performing radio communications with mobile stations is assigned in an overlap manner. The method of detecting overlap of a radio communications parameter is summarized as the method including the steps of: transmitting a common control channel used commonly for all of the mobile stations located within a cell served by the radio base station, according to a predetermined transmission pattern; acquiring a reception level of the common control transmission channel received by at least any one of the mobile stations; and determining whether or not the predetermined radio communications parameter overlaps with a radio communications parameter used by a different radio base station based on the reception level acquired in the acquiring step and the predetermined transmission pattern.

Moreover, the method may further include the step of changing a value of the predetermined radio communications parameter in a case where it is determined that the predetermined radio communications parameter overlaps with a radio communications parameter used in the different radio base station in the step of determining the overlap of the radio communications parameter.

The method may further include the step of notifying the different radio base station of a radio communications parameter after a change of the predetermined radio communications parameter in a case where the value of the predetermined radio communications parameter is changed in the step of changing the value of the predetermined radio communications parameter.

Additionally, in the step of transmitting a common control channel, the radio base station may transmit the common control channel according to the predetermined transmission pattern. Then, in the step of acquiring a reception level of the common control transmission channel received by at least any one of the mobile stations, the reception level from the mobile station which has received the common control channel transmitted from the radio base station may be acquired. In the step of determining the overlap of a radio communications parameter, whether or not the predetermined radio communications parameter overlaps with the radio communications parameter used by the different radio base station may be determined based on the reception level acquired from the mobile station which has received the common control channel transmitted from the radio base station.

Further, in the step of transmitting a common control channel, unlike the predetermined transmission pattern, the common control channel may be continuously transmitted. Then, in the step of acquiring a reception level of the common control transmission channel received by at least any one of the mobile stations, the reception level may be acquired from the mobile station which has received the common control transmission channel transmitted from the different radio base station. In the step of determining the overlap of a radio communications parameter, whether or not the predetermined radio communications parameter overlaps with the radio communications parameter used by the different radio base station may be determined based on the reception level acquired from the mobile station which has received the common control channel transmitted from the different radio base station.

According to the features of the present invention, it is possible to provide the radio base station, and the method of detecting overlap of a radio communications parameter, both of which are capable of detecting overlap of a radio communications parameter with other base stations without installing a overlap detecting function to a mobile station.

DESCRIPTION OF TEE PREFERRED EMBODIMENTS

Next, an embodiment of the present invention will be described. It should be noted that the same or similar components are designated for the same or similar reference numerals in the following descriptions of the drawings. However, the drawings are merely schematic representations, and it should also be noted that the dimensional ratios therein are different from those used in practice.

Accordingly, specific dimensions or the like should be determined in consideration of the following descriptions.

Moreover, it is needless to say that the drawings include portions where relationships and ratios of the dimensions are different from one another.

(Schematic Configuration of Radio Access Network)

Figure 1:
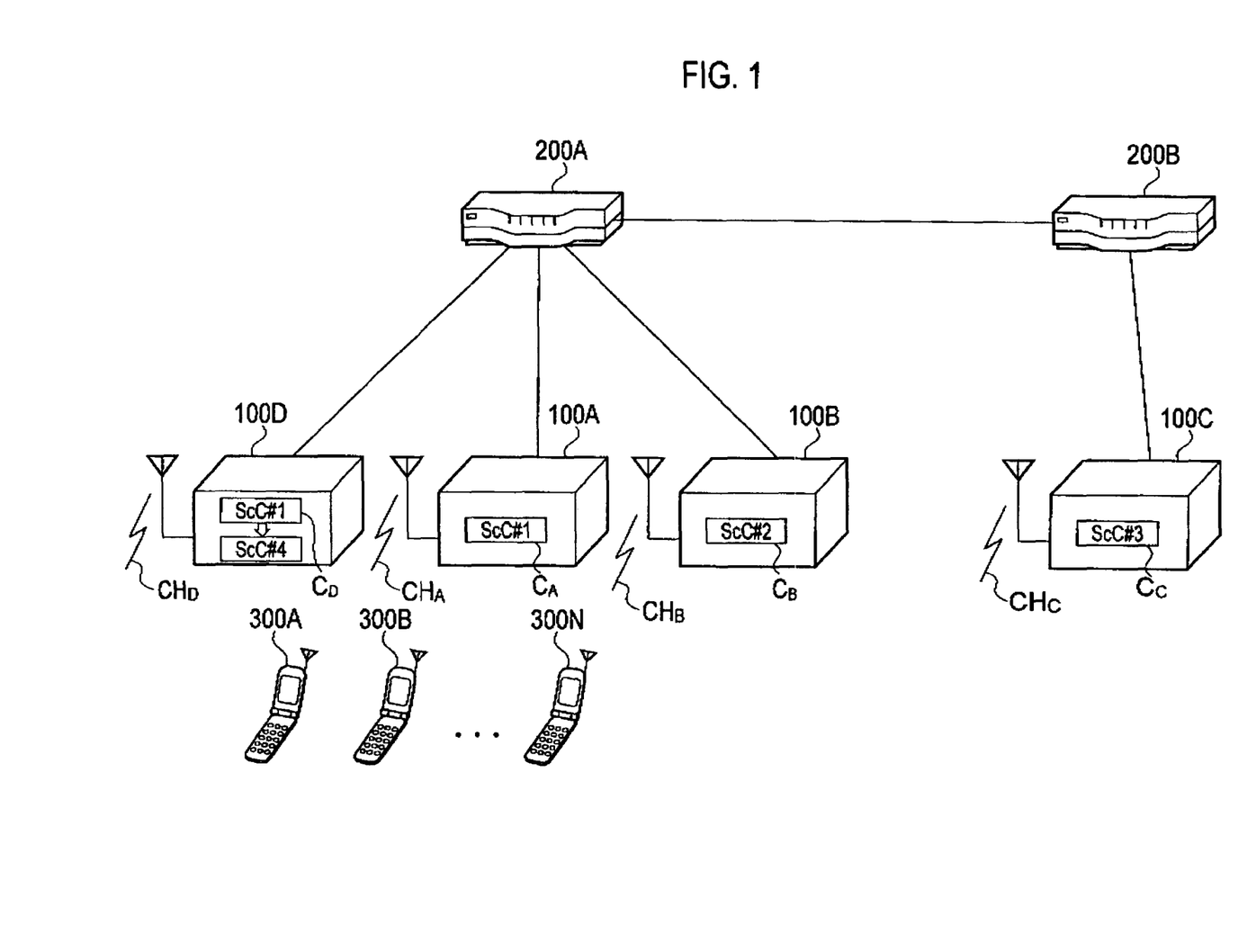
FIG. 1 is a schematic configuration diagram of a radio access network according to an embodiment of the present invention.

FIG. 1 is a schematic configuration diagram of a radio access network according to an embodiment of the present invention. The radio access network according to the embodiment constitutes a CDMA-based radio communications system as shown in FIG. 1. In this embodiment, the radio access network includes radio base stations 100A to 100D, and control routers 200A and 200B.

The radio base stations 100A to 100D perform radio communications with mobile stations 300A, 300B and 300N based on CDMA. In addition, the radio base stations 100A to 100D are capable of transmitting common control channels $CH_A$ to $CH_D$ which are commonly used for all of the mobile stations located within a cell.

The control router 200A is connected to the radio base stations 100A, 100B and 100D. The control router 200B is connected to the radio base station 100C. Additionally, the control routers 200A and 200B are connected to communicate with each other.

The control routers 200A and 200B execute the routing process for a control packet or the like which is transmitted or received by the radio base stations 100A to 100D. It should be noted that the number of radio base stations, control routers, and mobile stations is not limited to the number of these devices shown in FIG. 1.

In the radio access network according to this embodiment, a frequency division duplex (FDD) mode of CDMA, or a time division duplex (TDD) mode of CDMA is used. In addition, a spreading code, which is different from each of the radio base stations, specifically, a scrambling code (ScC) is set in each of the radio base stations 100A to 100D.

As shown in FIG. 1, a scrambling code $C_A$ of the radio base station 100A is set to ScC#1. A scrambling code $C_B$ of the radio base station 100B is set to ScC#2. A scrambling code $C_C$ of the radio base station 100C is set to ScC#3. Specifically, in the radio base stations 100A to 100D, of which a coverage area (cells) overlaps with one another, the same scrambling codes are not set, and a different scrambling code is set to each radio base station.

Here, the radio base station 100D is a new radio base station which is added to the existing radio base stations 100A to 100C. A scrambling code $C_D$ of the radio base station 100D is autonomously set to ScC#1 by the radio base station 100D. The radio base station 100D detects that ScC#1 overlaps with the scrambling code $C_A$ after the scrambling code $C_D$ of the radio base station D is autonomously set to ScC#1. The radio base station 100D set the scrambling code $C_D$ to ScC#4 which is not used in the radio base stations 100A to 100C.

(Functional Block Configuration)

Figure 2:
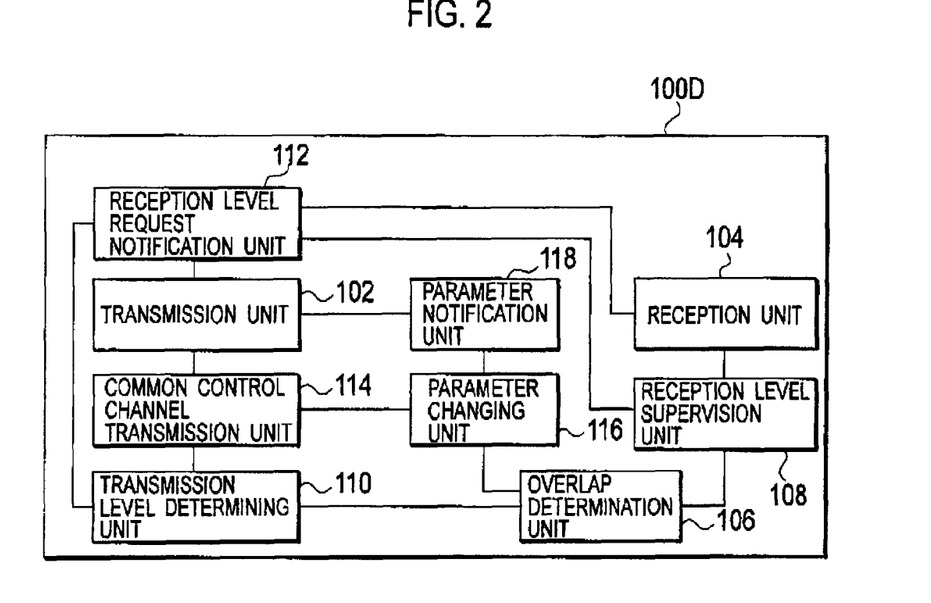
FIG. 2 is a functional block diagram of a radio base station according to an embodiment of the present invention.
Figure 3:
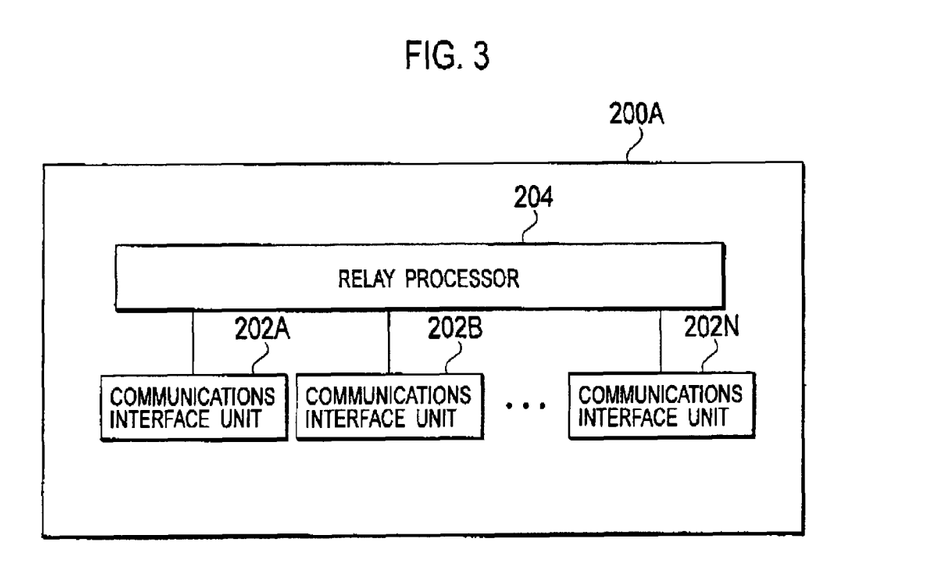
FIG. 3 is a functional block diagram of a control router according to an embodiment of the present invention.

Next, described will be functional block configurations of the radio base station 100D and the control router 200A, which are included in the aforementioned radio access network. The radio base stations 100A to 100C have the same functional block configuration as that of the radio base station 100D. Further, the control router 200B has the same functional block configuration as that of the control router 200A.

Hereinafter, the descriptions of portions of the functional blocks related to the present invention will be mainly provided. Accordingly, it should be noted that the radio base station 100D and the control router 200A may have a logical block, which is not illustrated, or the description of which is omitted, but which is required to function as a device (such as a power supply).

(1) Radio Base Station 100D

FIG. 2 is a functional block diagram of the radio base station 100D. As shown in FIG. 2, the radio base station 100D includes a transmission unit 102, a reception unit 104, a overlap determination unit 106, a reception level supervision unit 108, a transmission level determination unit 110, a reception level request notification unit 112, a common control channel transmission unit 114, a parameter changing unit 116 and a parameter notification unit 118.

The transmission unit 102 transmits a predetermined radio signal based on an instruction outputted from the reception level request notification unit 112 or the parameter notification unit 118. Further, the transmission unit 102 transmits various types of packets to the control router 200A.

The transmission unit 102 modulates a common control channel signal outputted from the common control channel transmission unit 114 into a radio signal, and transmits the modulated radio signal. In this embodiment, the operation in which a common control channel signal outputted from the common control channel transmission unit 114 is modulated into a radio signal and the modulated radio signal is transmitted, is described as "a common control channel is transmitted" when appropriate.

The reception unit 104 receives a radio signal transmitted from the mobile station 300A, 300B or 300N. Further, the reception unit 104 receives various packets from the control router 200A.

The overlap determination unit 106 determines whether or not a scrambling code $C_D$ used in the downlink of the radio base station 100D overlaps with a scrambling code set in a different radio base station. Specifically, based on a reception level of a mobile station (for example, the mobile station 300A) acquired by the reception level supervision unit 108 and a transmission pattern P1 of a common control channel (a predetermined transmission pattern, refer to FIG. 6) transmitted from the transmission unit 102, the overlap determination unit 106 determines whether or not the scrambling code $C_D$ (a predetermined parameter for radio communications) overlaps with the scrambling code set in the different mobile station.

Figure 8:
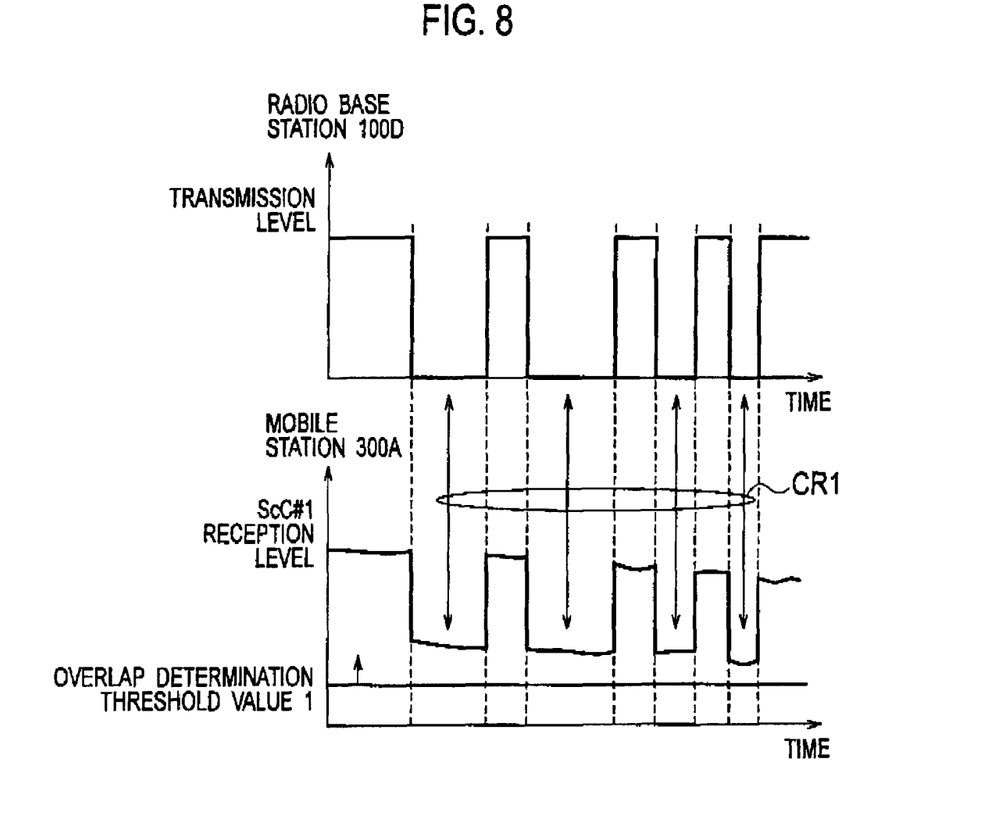
FIG. 8 is an explanatory diagram showing an operation of detecting overlap of a radio communications parameter by a radio base station according to an embodiment of the present invention.

More specifically, the overlap determination unit 106 can determine that the scrambling code $C_D$ overlaps with a scrambling code used by a different radio base station (for example, the radio base station 100A) in a case where a reception level of a mobile station is equal to or greater than overlap determination threshold value 1 (the first threshold value) when the transmission of the common control channel $CH_D$ is stopped (refer to FIG. 8). On the other hand, the overlap determination unit 106 can determine that a scrambling code $C_D$ does not overlap with a scrambling code used by a different radio base station in a case where a reception level of a mobile station is less than the overlap determination threshold value 1, when the transmission of the common control channel $CH_D$ is stopped (refer to FIG. 10).

The mobile stations transmit information indicating a reception level of each scrambling code together with the type of scrambling codes (for example, ScC#1). The mobile stations transmit the information to the base station. The overlap determination unit 106 determines whether or not the scrambling code overlaps with a scrambling code used by a different radio base station by comparing the reception level with the transmission pattern P1 of the common control channel $CH_D$ based on the reception level of the mobile station and the type of scrambling code received from the mobile station.

Further, the overlap determination unit 106 can determine that the scrambling code $C_D$ overlaps with a scrambling code $C_D$ used by a different radio base station in a case where a receiving pattern P2 (refer to FIG. 9) of the reception level of a mobile station located within a cell (cell $10_A$) served by the different radio base station matches the transmission pattern P1, during a period of time in which the different radio base station (for example, the radio base station 100A) continuously transmits the common control channel (common control channel $CH_A$). Specifically, the overlap determination unit 106 determines that the scrambling code $C_D$ overlaps with a scrambling code used by a different radio base station in a case where a timing, at which the reception level of the mobile station becomes equal to or less than an overlap determination threshold value 2 (the second threshold value), is synchronized with a timing at which the transmission of the common control channel $CH_D$ is stopped (refer to FIG. 9).

The reception level supervision unit 108 supervises the reception level of the common control channel $CH_D$ received by the mobile station 300A, 300B or 300N. Specifically, the reception level supervision unit 108 receives information from the corresponding mobile stations indicating the reception level of the common control channel $CH_D$ received by the mobile stations 300A, 300B or 300D. In this embodiment, a common control channel reception level acquisition unit is configured of the reception unit 104 and the reception level supervision unit 108.

Further, the reception level supervision unit 108 is capable of acquiring the information from a different radio base station (for example, the radio base station 100A) indicating a reception level of the common control channel $CH_A$ received by a mobile station located within a cell served by the different radio base station.

The transmission level determination unit 110 determines a transmission level (a transmission power) of the common control channel $CH_D$ transmitted from the common control channel transmission unit 114 via the transmission unit 102. Specifically, according to the transmission pattern P1 (refer to FIG. 6), the transmission level determination unit 110 causes the common control channel $CH_D$ to be transmitted from the common control channel transmission unit 114. In this embodiment, the transmission level determination unit 110 constitutes a transmission pattern controller.

Figure 6:
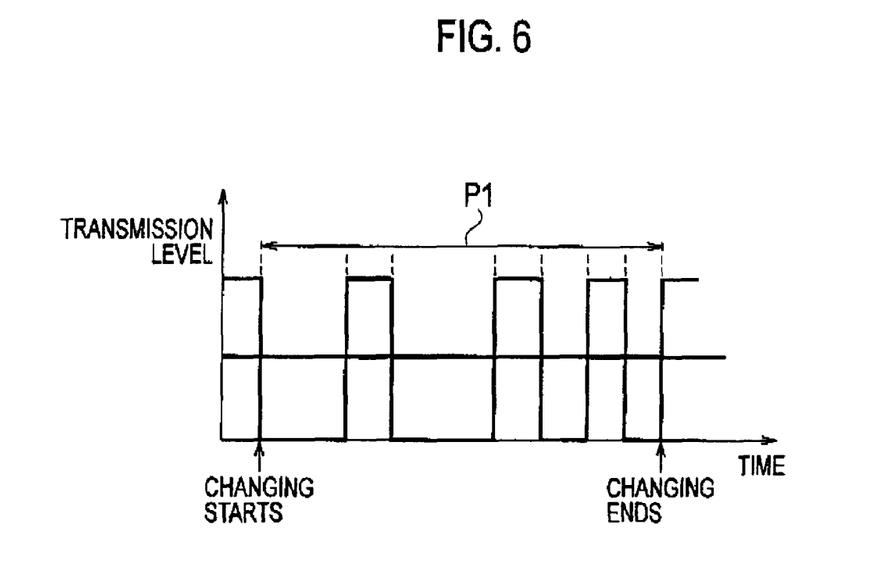
FIG. 6 is a diagram showing an example of a transmission pattern of a common control channel according to the embodiment of the present invention.

As shown in FIG. 6, the transmission level determination unit 110 fluctuates the transmission power of a radio signal which a common control signal is modulated based on the transmission pattern P1 in a predetermined cycle. Specifically, the transmission level determination unit 110 causes the common control channel $CH_D$ to be transmitted from the common control channel transmission unit 114 according to the transmission pattern P1, in which transmission of the common control channel $CH_D$ and stopping transmission of the common control channel $CH_D$ are repeated.

Figure 7:
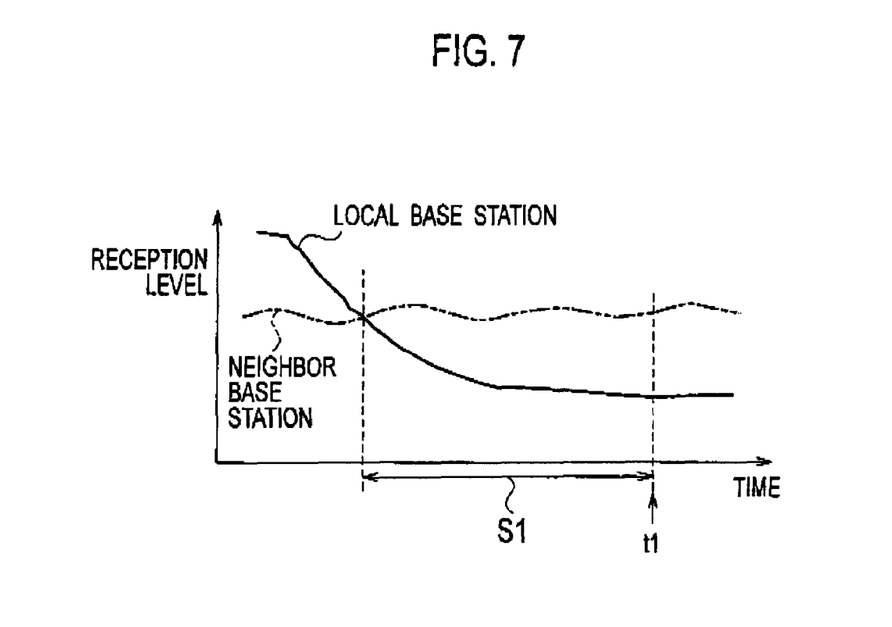
FIG. 7 is a diagram showing a reception level of a common control channel transmitted from a radio base station communicating with a mobile station according to an embodiment of the present invention.

It should be noted that as shown in FIG. 7, a period of time, in which the stopping of transmission of the common channel $CH_D$ continues, is set to be shorter than a period of time until a mobile station (for example, the mobile station 300A) determines that the mobile station has moved out of a cell $10_D$ (refer to FIG. 5A) of the radio base station 100D (a timing t1 in FIG. 7), or a period of time until the mobile station determines to move to communications via a different radio base station (an interval S1 in FIG. 7). Specifically, as shown in FIG. 7, a period of time, in which the stopping of transmission of the common control channel continues, is set to be shorter than a period of a specific hysteresis time (corresponding to interval S1) in order to avoid a situation where a mobile station has moved to communications via a different radio base station, or has moved out of the current communications area (cell), when the reception level of the common control channel of the radio base station in which the mobile station is located (a local area base station) becomes continuously smaller than the specific hysteresis time.

Further, the transmission level determination unit 110 is capable of causing the common control channel $CH_D$ to be transmitted continuously from the common control channel transmission unit 114 (refer to FIG. 9), which is different from the transmission pattern P1.

The transmission level determination unit 110 is also capable of causing the common control channel $CH_D$ to be transmitted from the common control channel transmission unit 114 according to the transmission pattern P1 when the number of mobile stations located within the cell $10_D$ of the radio base station 100D (refer to FIG. 5A) becomes equal to or greater than a predetermined number.

The reception level request notification unit 112 generates a reception level request notification requesting each mobile station located in the cell $10_D$ to report information indicating the reception level of the common control channel $CH_D$ according to an instruction from the reception level supervision unit 108. The generated reception level request notifications are transmitted to the mobile stations via the transmission unit 112. Further, the reception level request notification unit 112 is capable of requesting the mobile stations to periodically report information indicating the reception level of the common control channel $CH_D$.

Further, the reception level request notification unit 112 is capable of generating a reception level request notification requesting a different mobile station to report information indicating the reception level of the common control channel $CH_A$ received by a mobile station located within a cell served by the different radio base station (for example, the radio base station 100A) according to an instruction from the reception level supervision unit 108. The generated reception level request notification is transmitted to the different radio base station via the transmission unit 102 and a control router.

Moreover, when the reception level request notification unit 112 receives a reception level request notification from a different radio base station, the reception level request notification unit 112 is also capable of reporting the information indicating the reception level of the common control channel $CH_A$ received by a mobile station located within the cell $10_D$ to the different radio base station.

The common control channel transmission unit 114 transmits the common control channel $CH_D$ with the scrambling code $C_D$ based on the transmission level determined by the transmission level determination unit 110.

The parameter changing unit 116 changes a value of the scrambling code $C_D$ when the overlap determination unit 106 determined that the scrambling code $C_D$ overlaps with one used by a different radio base station. For example, the parameter changing unit 116 changes the value of the scrambling code $C_D$ to ScC#4, when it is determined that the scrambling code $C_D$ to which ScC#1 has been originally set overlaps with the value set to the scrambling code $C_A$ of the radio base station 100A.

The parameter notification unit 118 notifies the different radio base station of a parameter which is changed for radio communications after the change when the value of the scrambling code $C_D$ is changed by the parameter changing unit 116.

(2) Control Router 200A

FIG. 3 is a functional block diagram of the control router 200A. As shown in FIG. 3, the control router 200A includes communications interface units 202A to 202N and a relay processor 204.

The communications interface units 202A to 202N connect communications lines between the radio base stations 100A, 100B and 100D.

The relay processor 204 executes the relay process of a packet transmitted and received via the communications interface units 202A to 202N. Particularly, in this embodiment, the relay processor 204 executes the relay process of a packet including a reception level request notification transmitted and received by the radio base stations 100A to 100D or information indicating a reception level.

(Operation of Radio Base Station)

Figure 4:
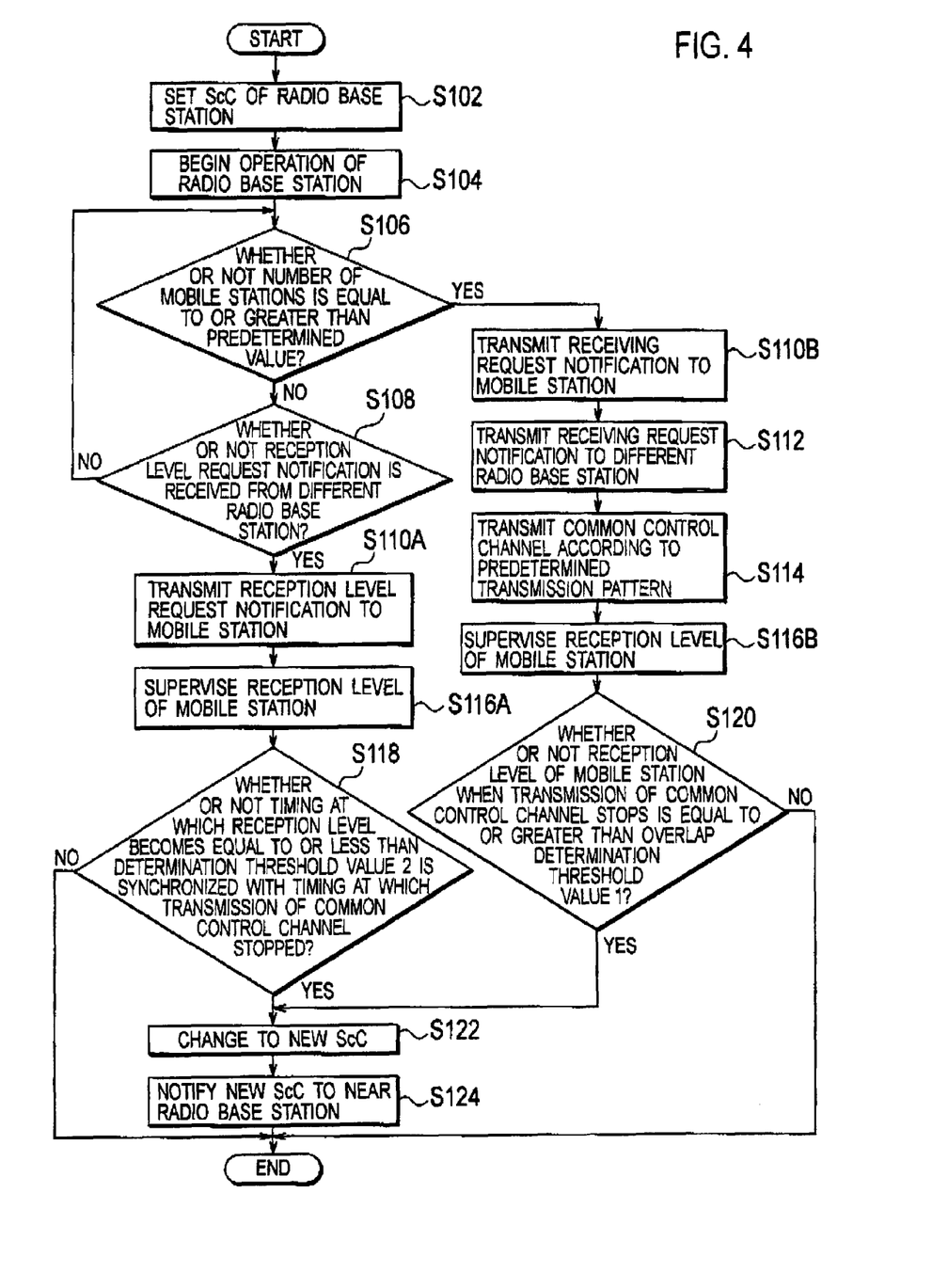
FIG. 4 is an operation flowchart of the radio base station according to an embodiment of the present invention.

An operation of the aforementioned radio base station 100D will now be described. Specifically, the operation when the radio base station 100D is newly provided in the radio access network will be described.

The radio base station 100D detects that the scrambling code $C_D$ which has been originally set to itself overlaps with the scrambling code $C_A$ of the radio base station 100A, and thus changes the value of the scrambling code $C_D$.

(1) Operation Flow

FIG. 4 is an operation flowchart of the radio base station 100D. As shown in FIG. 4, in Step S102, the radio base station 100D which is newly deployed sets the scrambling code $C_D$ used in the downlink, as well as the frequency or the like. Here, the radio base station 100D sets ScC#1 as the scrambling code $C_D$.

In Step S104, the radio base station 100D starts an operation as a radio base station, such as transmission of the common control channel $CH_D$ or the like using the scrambling code $C_D$(ScC#1) which has been set.

In Step S106, the radio base station 100D determines whether or not the number of mobile stations located within the cell $10_D$ is equal to or greater than a predetermined value.

If the number of mobile stations located within the cell $10_D$ is less than the predetermined value (NO in Step S106), in Step S108, the radio base station 100D determines whether or not a reception level request notification, which periodically reports the reception level of the common control channel $CH_D$ in a mobile station, is received from a different radio base station (for example, the radio base station 100A).

If the reception level request notification is received (YES in Step S108), in Step S110A, the radio base station 100D transmits the reception level request notification requesting the mobile station (for example, the mobile station 300A) located within the cell $10_D$ to periodically report the reception level of the common control channel $CH_D$.

If the reception level request notification is not received (NO in Step 108), the radio base station 100D repeats the processing from Step S106.

In Step S116A, the radio base station 100D acquires information indicating the reception level of the common control channel $CH_D$ and the type of scrambling code, both of which are transmitted from the mobile station. The radio base station 100D supervises the reception level of the common control channel $CH_D$ in the mobile station based on the acquired information.

In Step S118, the radio base station 100D determines whether or not a timing, at which the reception level of the common control channel $CH_D$ in the mobile station becomes equal to or less than the overlap determination threshold value 2 (refer to FIG. 9), is synchronized with a timing at which the transmission of the common control channel $CH_D$ is stopped.

On the other hand, if the number of mobile stations located within the cell $10_D$ is equal to or greater than a predetermined value (YES in Step S106), in Step S110B, the radio base station 100D transmits the reception level request notification, which requests a mobile station located within the cell $10_D$ (for example, the mobile station 300A) to periodically report the reception level of the common control channel $CH_D$, as in Step S110A.

In Step 112, the radio base station 100D transmits a reception level request notification, which requests a different radio base station to report information indicating the reception level of the common control channel $CH_A$ received by a mobile station (for example, the mobile station 300B) located within the cell $10_A$ (refer to FIG. 5B) served by the radio base station 100A.

In Step S114, the radio base station 100D transmits the common control channel $CH_D$ according to a predetermined transmission pattern, that is, the transmission pattern P1.

In Step S116B, the radio base station 100D supervises the reception level of the common control channel $CH_D$ in the mobile station as in Step S116A.

In Step S120, the radio base station 100D determines whether or not the reception level of the mobile station is equal to or greater than the overlap determination threshold value 1 when the transmission of the common control channel $CH_D$ is stopped.

The mobile base station 100D changes a scrambling code to a new scrambling code when a timing, at which the reception level of the common control channel $CH_D$ becomes equal to or greater than the overlap determination threshold value 2, is synchronized with a timing at which the transmission of the common control channel $CH_D$ is stopped (YES in Step S118). The mobile base station 100D also changes the scrambling code to a new scrambling code in Step S122, when the reception level of the mobile station, at a time when the transmission of the common control channel $CH_D$ is stopped, is equal to or greater than the overlap determination threshold value 1 (YES in Step S120). Specifically, the radio base station 100D changes the value of the scrambling code $CH_D$ to ScC#4 which is not used by any of the radio base stations near the radio base station 100D.

In Step S124, the radio base station 100D notifies the near radio base stations (the radio base stations 100A to 100C) of the new scrambling code (ScC#4).

On the other hand, the radio base station 100D ends the operation of detecting the overlap of scrambling codes when a timing, at which the reception level of the common control channel $CH_D$ becomes equal to or less than the overlap determination threshold value 2, is not synchronized with a timing, at which the transmission of the common control channel $CH_D$ is stopped (NO in Step S118). The radio base station 100D also ends the operation of detecting the overlap of scrambling codes in a case where a reception level of a mobile station is less than the overlap determination threshold value 1 when the transmission of the common control channel $CH_D$ is stopped (NO in Step S120).

(2) Specific Operation Example

Figure 5A:
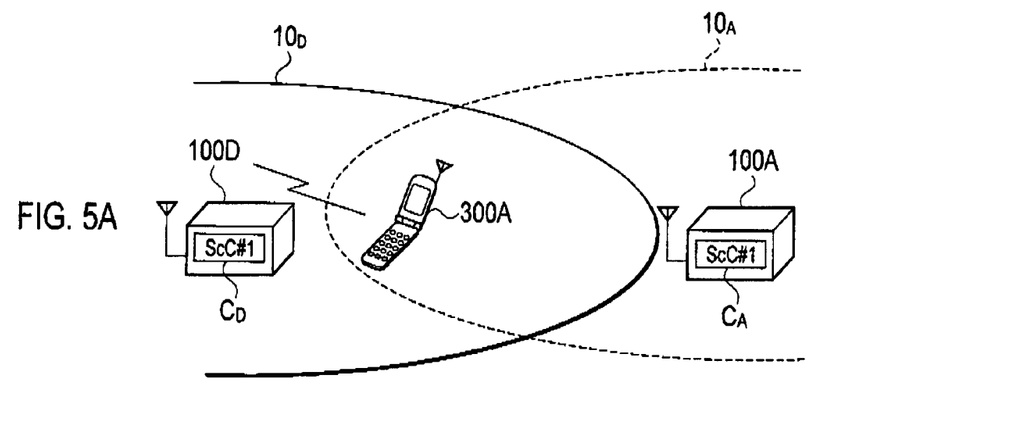
FIGS. 5A to 5C are explanatory diagrams for illustrating an operation of the radio base station according to an embodiment of the present invention.

Next, a specific operation example of the aforementioned radio base station 100D will be explained. FIG. 5A shows a state in which the same scrambling code is used in a radio base station near the radio base station 100D; specifically, the radio base station 100A, and the radio base station 100D use the same scrambling codes. Further, in the state shown in FIG. 5A, the radio base station 100D transmits the common control channel $CH_D$ to the mobile station 300A located within the cell $10_D$ according to the transmission pattern P1 (refer to FIG. 6).

Figure 5B:
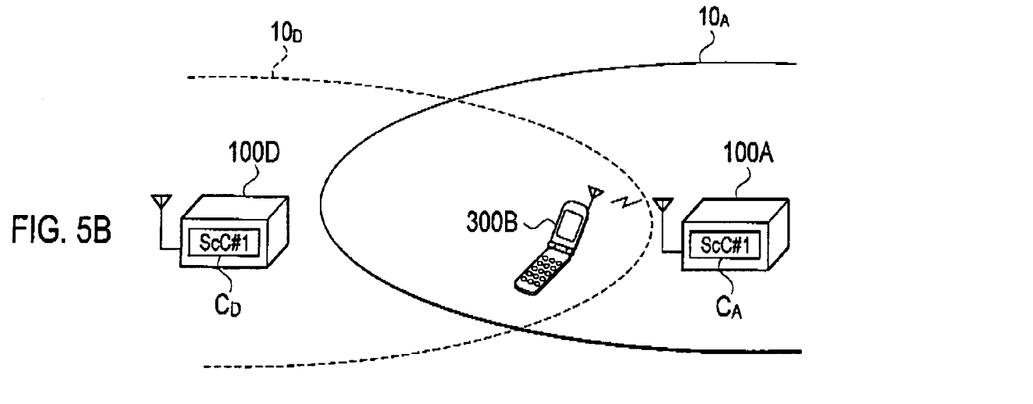

FIG. 5B shows a state in which the radio base stations 100A and 100D use the same scrambling codes, and the radio base station 100A continuously transmits the common control channel $CH_A$ to the mobile station 300B located within the cell $10_A$.

Figure 5C:
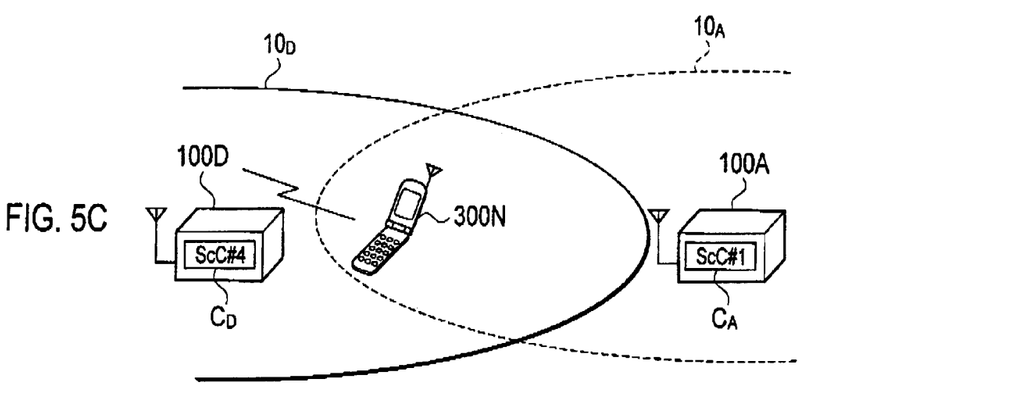

FIG. 5C shows a state in which the radio base stations 100A and 100D use different scrambling codes, and the radio base station 100D transmits the common control channel $CH_D$ to the mobile station 300N located within the cell $10_D$ according to the transmission pattern P1 (refer to FIG. 6).

Further, as described above, the radio base stations 100A to 100D hold the transmission pattern P1 in common, and thus can transmit the common control channels (common control channels $CH_A$ to $CH_D$) according to the transmission pattern P1 as shown in FIG. 6. Moreover, as described above, a period of time, in which the transmission of the common channel is stopped, is set to be shorter than a period of time until a mobile station determines that the mobile station has moved out of the cell of the radio base station (the timing t1 in FIG. 7), or a period of time until the mobile station determines to move to communications via a different radio base station (the interval S1 in FIG. 7).

FIG. 8 corresponds to FIG. 5A. Specifically, FIG. 8 shows the transmission level of the common control channel transmitted from the radio base station 100D according to the transmission pattern P1, and the reception level of the common control channel received by the mobile station 300A.

In a case where a reception level of the mobile station 300A is equal to or greater than the overlap determination threshold value 1 when the transmission of the common control channel $CH_D$ is stopped (the portion indicated by the circle CR1 in FIG. 8), the mobile station 100D determines that the scrambling code $C_D$ overlaps with one used by a different mobile station (for example, the mobile station 100A).

Figure 9:
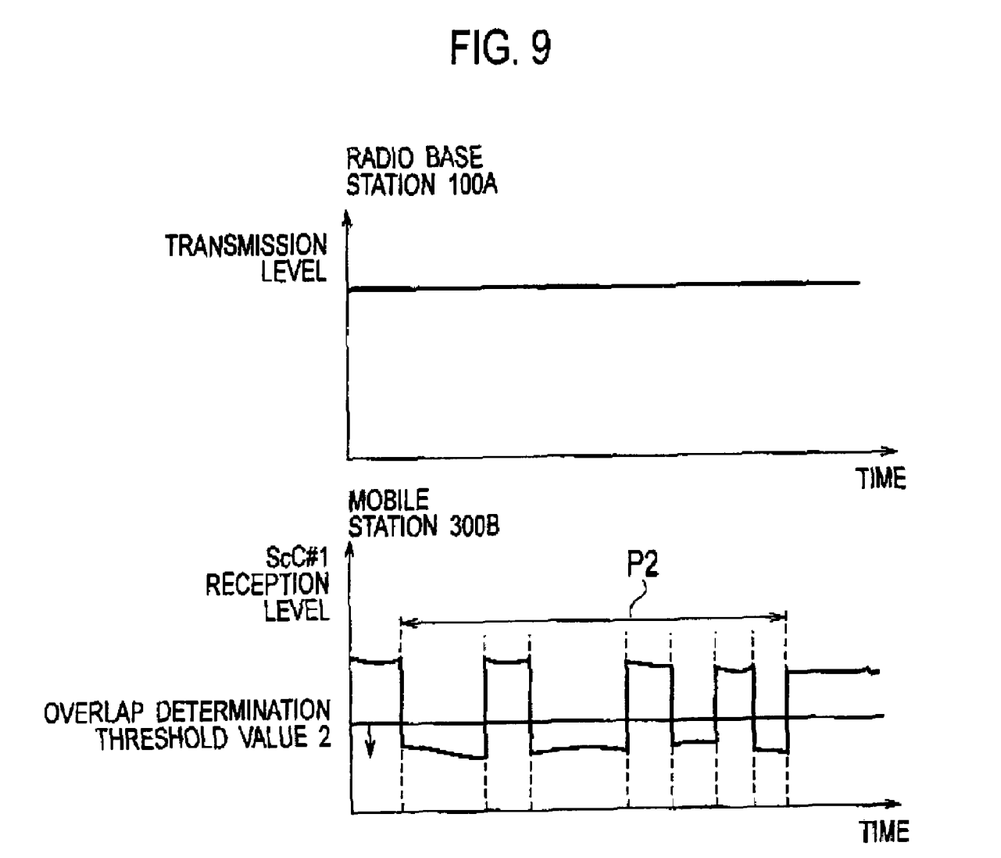
FIG. 9 is an explanatory diagram for explaining an operation of detecting the overlap of a radio communications parameter by the radio base station according to an embodiment of the present invention.

FIG. 9 corresponds to FIG. 5B. Specifically, FIG. 9 shows a transmission level of a common control channel continuously transmitted from the radio base station 100A, and a reception level of a common control channel received by the mobile station 300B.

In a case where the receiving pattern P2 of the reception level of the mobile station 300B located within the cell $10_A$ match the transmission pattern P1 during the time when the communication control channel $CH_A$ is continuously transmitted from the radio base station 100A, the radio base station 100D determines that the scrambling code $C_D$ overlaps with one used by the radio base station 100A. Specifically, the radio base station 100D determines that the scrambling code $C_D$ overlaps with a different radio base station, when a timing, at which a reception level of the mobile station 300B becomes equal to or less than the overlap determination threshold value 2, is in synchronized with a timing at which a transmission of the common control channel $CH_D$ is stopped. Note that a reception level of the mobile station 300B is transmitted to the radio base station 100D from the radio base station 100A.

Figure 10:
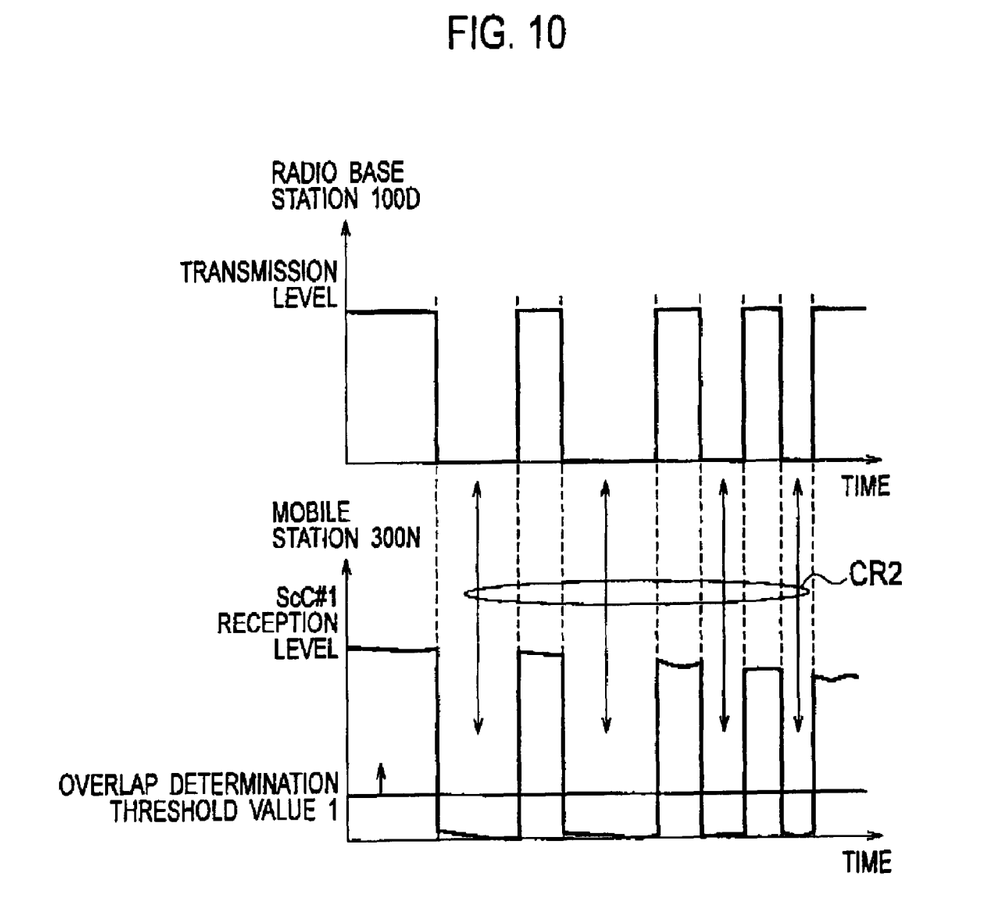
FIG. 10 is an explanatory diagram showing an operation of detecting the overlap of a parameter for radio communications by the radio base station according to an embodiment of the present invention.

FIG. 10 corresponds to FIG. 5C. Specifically, FIG. 10 shows a transmission level of a common control channel transmitted from the radio base station 100D according to the transmission pattern P1, and a reception level of a common control channel received by the mobile station 300N.

In a case where a reception level of the mobile terminal 300N is less than the overlap determination threshold value 1 when a transmission of the common control channel $CH_D$ is stopped (the portion indicated by the circle denoted by reference numeral CR2 in FIG. 10), the radio base station 100D determines that the scrambling code $C_D$ does not overlap with one used by the radio base station 100A.

Further, even in a case where the radio base stations 100A and 100D use different scrambling codes, and a mobile station is located within the cell $10_D$ of a radio base station (for example, the radio base station 100D) which transmits a common control channel, the radio base station determines that the scrambling codes do not overlap with each other when a reception pattern of the common control channel is not synchronized with the transmission pattern of the common control channel.

(Function and Effect)

According to the radio base stations 100A to 100D, whether or not a scrambling code overlaps with one used by a different radio base station is determined based on the reception level of the common control channel received by a mobile station and the transmission pattern P1. Further, the measurement of the reception level of the common control channel at a mobile station can be realized by using an exiting function of the mobile station.

Thus, it is made possible to detect that the radio communications parameter overlaps with one used in a different radio base station without installing in a mobile station a function to detect the overlap of a scrambling code to be assigned to each radio base station.

According to the radio base stations 100A to 100D, when the radio base station determines that a scrambling code overlaps with one used by a different radio base station, a value of the scrambling code is automatically changed. Thus, the operation to set a scrambling code by an operator of the radio base station can be avoided. Further, scrambling codes are not necessarily assigned based on a computer simulation.

According to the radio base stations 100A to 100D, when a value of a scrambling code is changed, the scrambling code after the change is notified to a different radio base station. Therefore, the different radio base station can promptly recognize that an assignment of a scrambling code in an overlap manner has been avoided. Thus, it is also possible to avoid unnecessarily changing a scrambling code by the different radio base station.

Further, in the transmission pattern P1, transmission of a common control channel and stopping of the transmission of a common control channel are repeated. Thus, a radio base station can determine more easily whether or not a reception level of a mobile station matches the transmission pattern P1 than a case where a transmission level (transmission power) of a radio signal in which a common control channel has been modulated is changed.

Moreover, a period of time, in which a transmission of a common channel is stopped, is shorter than a period of time until a mobile station determines that the mobile station has moved out of a cell or a period of time (an interval S1 in FIG. 7) until a mobile station determines to move to communications via a different radio base station. Thus, it is possible to prevent the mobile station from being wrongly determined that it has moved out of the cell or that the mobile station moves to communications via the different base station due to the stopping of transmission of common control channel.

According to the radio base stations 100A to 100D, in a case where a pattern of a reception level of a mobile station located within a cell served by a different radio base station matches the transmission pattern P1 during a period of time when a communication control channel is continuously transmitted by the different radio base station, the radio base station determines that a scrambling code overlaps with one used by the different radio base station. Thus, whether or not the scrambling code overlaps with one used in the different radio base station can be determined based on the reception level of the mobile station located within the cell served by the different radio base station instead of its own radio base station.

According to the radio base stations 100A to 100D, in a case where the number of mobile stations located within a cell becomes equal to or greater than a predetermined number, a common control channel is transmitted according to the transmission pattern P1. Thus, the event at which the transmission level (transmission power) of the common control channel is changed can be limited to only a case where the overlap of the scrambling codes can be further accurately determined by observing the reception level of the common control channel from a number of mobile stations equal to or greater than the predetermined number.

Other Embodiments

Although the present invention has been disclosed with reference to one embodiment as mentioned above, it is to be understood that the present invention is not limited to the descriptions and drawings forming part of the disclosure of the present invention. It will be obvious to those skilled in the art that various alternative embodiments of the present invention are possible in the light of the above teachings.

For example, in the aforementioned embodiment of the present invention, it is determined that the scrambling code $C_D$ overlaps with one used in a different base station when a timing, at which a reception level of the mobile base station 300B becomes equal to or less than the overlap determination threshold value 2, is synchronized with a timing at which a transmission of the common control channel $CH_D$ is stopped. However, it may be determined that the scrambling code $C_D$ overlaps with one used in a different base station by determining whether or not a changing pattern of a reception level matches a predetermined pattern, instead of using the overlap determination threshold value 2.

The parameter changing unit 116 and the parameter notification unit 118 provided in the radio base station 100D in the aforementioned embodiment may not necessarily be provided therein. In this case, a change of a scrambling code due to a detection of an overlap of a scrambling code may be performed by an operator of the radio base station, or by another system.

Further, a transmission pattern of a common control channel is not limited to the transmission pattern P1 shown in FIG. 6, and a pattern which varies a transmission level may be used. Moreover, a period of time, in which stopping of transmission of a common control channel will be continued, may not be necessarily shorter than the interval S1 shown in FIG. 7.

In the aforementioned embodiments, an assumption is made that a downlink scrambling code is included in a peripheral zone table in a radio communications system with CDMA. However, the applicable scope of the present invention is not limited to a radio communications system with COMA. For example, the present invention can be applied to a radio communications system with TDMA or FDMA. Specifically, the content of the peripheral zone table can be automatically changed as well in a case of TDMA where a downlink timeslot is included in the peripheral zone table broadcasted by a radio base station to be newly provided. The content of the peripheral zone table can also be automatically changed as well in a case of FDMA where a downlink frequency range is included in the peripheral zone table broadcasted by a radio base station to be newly provided.

As a matter of course, it is to be understood that the present invention is intended to cover other various embodiments which are not described in the description. The scope of the present invention is therefore to be determined solely by the appended claims.

What is clamed is:

1. A radio base station performing radio communications with mobile stations, comprising:
   a common control channel transmission unit configured to transmit a common control channel used commonly for all of the mobile stations located within a cell by using a predetermined radio communications parameter to be assigned to each radio base station;
   a transmission pattern controller configured to cause the common control channel to be transmitted from the common control channel transmission unit according to a predetermined transmission pattern;
   a common control channel reception level acquisition unit configured to acquire a reception level of the common control channel received by at least any one of the mobile stations; and
   a overlap determination unit configured to determine whether or not the predetermined radio communications parameter overlaps with a radio communications parameter used by a different radio base station based on the reception level acquired by the common control channel reception level acquisition unit and the predetermined transmission pattern.

2. The radio base station of claim 1, further comprising:
   a parameter changing unit configured to change a value of the predetermined radio communications parameter in a case where the overlap determination unit determines that the predetermined radio communications parameter overlaps with a radio communications parameter used in the different radio base station.

3. The radio base station of claim 2, further comprising:
   a parameter notification unit configured to notify the different radio base station of a radio communications parameter after a change of the predetermined radio communications parameter in a case where the value of the predetermined radio communications parameter is changed by the parameter changing unit.

4. The radio base station of claim 1, wherein the transmission pattern controller causes the common control channel to be transmitted from the common control channel transmission unit according to the predetermined transmission pattern in which transmission of the common control channel, and stopping of the transmission of the common control channel are repeated.

5. The radio base station of claim 4, wherein a period of time, in which the transmission of the common control channel is stopped, is shorter than any one of a period of time until the mobile station determines that the mobile station has moved out of the cell, and a period of time until the mobile station determines to move to communications via the different base station.

6. The radio base station of claim 4, wherein the overlap determination unit determines that the predetermined radio communications parameter overlaps with the radio communications parameter used by the different radio base station in a case where the reception level, at the time of stopping the transmission of the common control channel, is equal to or greater than a first threshold value.

7. The radio base station of claim 1, wherein the common control channel reception level acquisition unit acquires a reception level of a common control channel which is received from the different radio base station by a mobile station located within a cell served by the different radio base station and wherein the common control channel reception level acquisition unit acquires the reception level from the different radio base station.

8. The radio base station of claim 7, wherein the overlap determination unit determines that the predetermined radio communications parameter overlaps with the radio communications parameter used in the different radio base station, in a case where a pattern of the reception level of the mobile station located within the cell served by the different radio base station matches the predetermined transmission pattern, while the different radio base station continuously transmits a common control channel.

9. The radio base station of claim 8, wherein the overlap determination unit determines that the predetermined radio communications parameter overlaps with the radio communications parameter used by the different radio base station in a case where a timing at which the reception level becomes equal to or less than a second threshold value synchronizes with a timing at which the transmission of the common control channel is stopped.

10. The radio base station of claim 1, wherein the transmission pattern controller causes the common control channel to be transmitted from the common control channel transmission unit according to the predetermined transmission pattern, in a case where the number of mobile stations located within the cell becomes equal to or greater than a predetermined number.

11. A method of detecting overlap of a radio communications parameter, which is used for detecting that the radio communications parameter to be assigned to each radio base station performing radio communications with mobile stations is assigned in an overlap manner, the method comprising the steps of:
    transmitting a common control channel used commonly for all of the mobile stations located within a cell served by the radio base station, according to a predetermined transmission pattern;
    acquiring a reception level of the common control transmission channel received by at least any one of the mobile stations; and
    determining whether or not the predetermined radio communications parameter overlaps with a radio communications parameter used by a different radio base station based on the reception level acquired in the acquiring step and the predetermined transmission pattern.

* * * * *